UNITED STATES PATENT OFFICE.

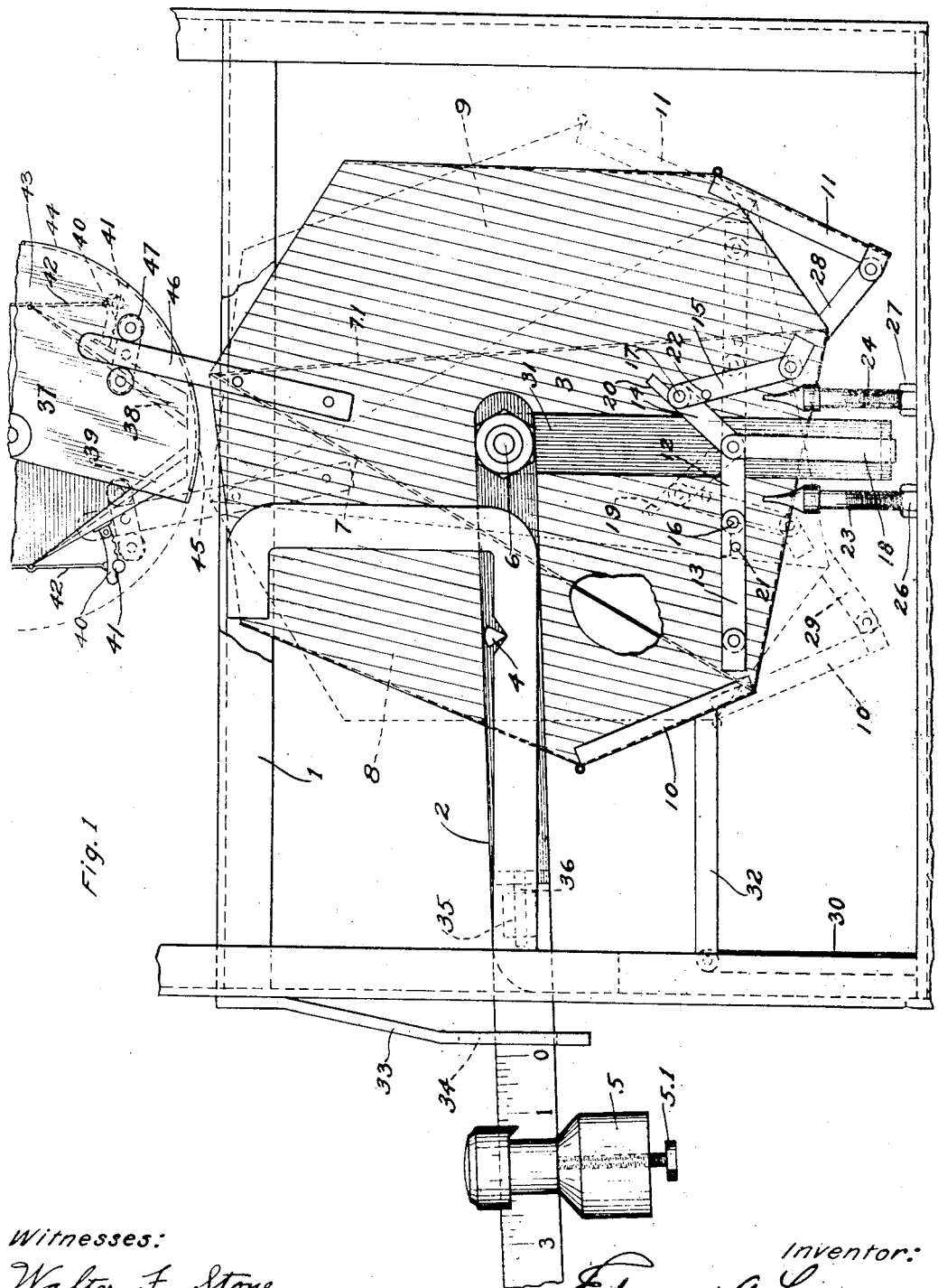

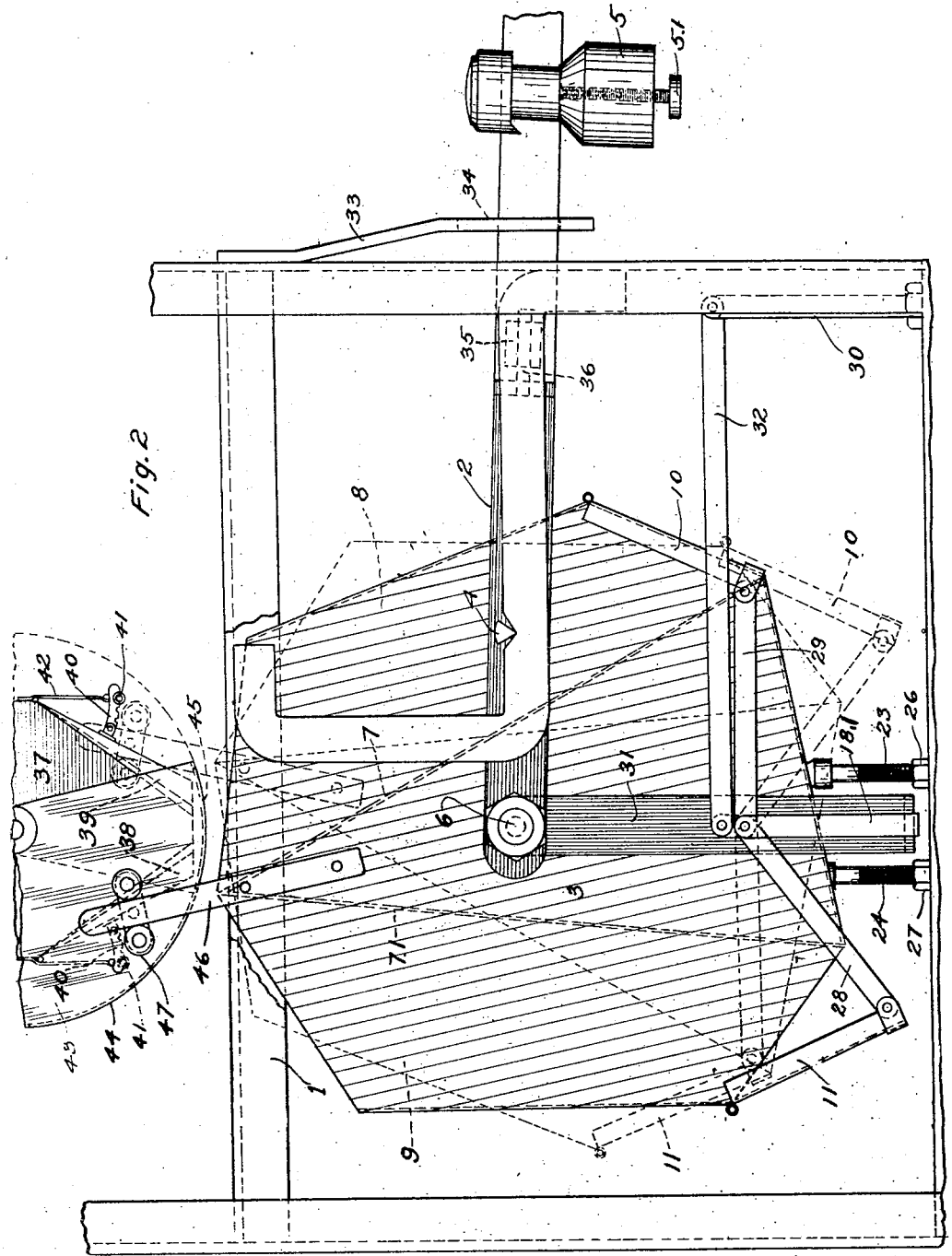

EDWARD A. LAVO, OF CHICAGO, ILLINOIS, ASSIGNOR OF ONE-HALF TO HAROLD L. CROWN AND ONE-HALF TO SOPHUS RAABERG, BOTH OF CHICAGO, ILLINOIS.

AUTOMATIC WEIGHING-SCALE.

1,117,678.

Specification of Letters Patent. Patented Nov. 17, 1914.

Application filed March 21, 1914. Serial No. 827,543.

*To all whom it may concern:*

Be it known that I, EDWARD A. LAVO, a citizen of the United States of America, and a resident of Chicago, county of Cook, and State of Illinois, have invented certain new and useful Improvements in Automatic Weighing-Scales, of which the following is a specification.

The main objects of this invention are to provide an improved automatic weighing scale particularly adapted for use in weighing cereals, which are fed thereto in a substantially continuous stream; to provide an improved construction and arrangement of the weighing receptacle, or scale pan; to provide an improved arrangement of the mechanism for locking the receptacle in its tilted positions, and for opening and closing the discharge outlets of the receptacle-compartments; and to provide improved means for checking the discharge of material from the supply hopper when the receptacle is tilting.

An illustrative embodiment of this invention is shown in the accompanying drawings, in which:

Figure 1 is a side elevation of an automatic weighing scale embodying the foregoing improvements, the view showing the means whereby the weighing receptacle is locked in its tilted positions, the full and dotted outlines indicating respectively the two positions of the receptacle. Fig. 2 is a similar view from the opposite side of the device showing the links which open and close the gates for the discharge outlets of said receptacle.

In the construction shown in the drawings, the support for the device comprises a suitable framework 1 made up preferably of angle bars and arranged so as to either stand on the floor or be suspended from above. A Y-shaped scale beam 2 is fulcrumed on the frame 1 by means of the knife edge trunnions 4, and is provided with the usual weight 5 carrying a set screw 5.1 adapted to secure the weight in registration with the graduations on the scale beam 2.

The weighing receptacle or bucket 3 is pivotally mounted on trunnions 6 carried at the ends of the parallel legs of the scale beam 2. The bucket is herein shown to be of heptagonal shape and has partitions 7 and 7.1 extending from the angle formed by the two top sides to the ends of the base so as to divide the bucket into two compartments 8 and 9. The compartments are open at the top and have discharge outlets at the bottom adapted to be closed by gates or doors 10 and 11 which constitute two sides of the bucket.

The tipping or oscillating of the bucket, so as to alternate the filling of the compartments 8 and 9, is controlled by means of links 12 and 13, and 14 and 15, respectively arranged in pairs and pivotally connected together at 16 and 17, so as to constitute what are known as knee levers. The links 12 and 14 are pivoted to a post 18, and the links 13 and 15 are pivoted to the sides of the bucket. Shoulders or fingers 19 and 20 are formed on the links 12 and 14, and are adapted to engage the respective pins 21 and 22 carried by the links 13 and 15 which limit the downward movement of the links, as shown in Fig. 1, whereby the bucket is locked in one or the other of its positions.

The knee levers are tripped by stud bolts 23 and 24 secured to the frame 1 and positioned so that they will be engaged by the respective links 12 and 14, whereby the respective joints 16 and 17 are broken as the bucket descends so as to allow it to be tilted to one side or the other. The studs 23 and 24 are provided with nuts 26 and 27, by means of which they are adapted to be adjusted so as to time the tilting of the bucket.

The gates 10 and 11 are hinged along their upper edges to the upright ends of the bucket 3, and the opening and closing thereof is controlled by the tilting of the bucket through the action of the links 28 and 29. The links 28 and 29 are pivotally connected at their inner ends to a post 18.1, and at their outer ends to the respective gates 10 and 11, and arranged in such manner that as the bucket tilts one gate opens and the other closes.

The posts 18 and 18.1 are supported on a yoke 31 secured at its ends to the ends of the parallel legs of the scale beam 2, and embracing the bucket 3. The yoke 31 is maintained in a substantially vertical position during the movement of the bucket by means of a link 32 pivoted to the post 18 and to a post 30 which is rigidly secured on the frame 1.

An arm 33 is secured to the frame 1 and has an aperture or slot 34 formed in the lower end thereof, through which the scale beam 2 extends. The slot 34 is arranged so as to limit the movement of the scale beam 2. A balance ball 35 is mounted on a threaded pin 36 secured to the scale beam 2 and adapted to be used for adjusting the balance of the scale beam and bucket.

A suitable hopper or chute 37 is located above the bucket 3 in position to direct material flowing therefrom into one or the other of the compartments 8 and 9. The chute is provided with gates 38 and 39 hinged at their upper ends and arranged to be adjusted so as to vary the volume of the stream of material flowing from said chute is provided with gates 38 and 39 is determined by means of suitable arc-shaped bars 40 which are adapted to be secured in any desired position by bolts 41 carried on the brackets 42 secured on the chute.

A cutoff pan or stirrup 43 is pivotally suspended from the chute 37, so as to be moved back and forth across the mouth of the chute for the purpose of bringing one or the other of the openings 44 and 45 into registration with said mouth. The cut-off pan is operated by the tilting of the bucket 3 through the medium of an arm 46 rigidly secured to one side of the bucket 3, and having its upper end confined between the anti-friction rollers 47 mounted on the sides of said pan. The arrangement of the arm 46 is such that the pan will be shifted to move the part between the openings 44 and 45 across the mouth of the chute 37 when the upper abutting edges of the partitions 7 and 7.1 are passing said mouth.

The operation of the device shown is as follows: The weight is set and locked on the scale beam 2 at any desired point. Assuming that the bucket is in the position indicated by full outlines in Fig. 1, the material to be weighed, such as cereals, tea, etc., is allowed to flow from the supply hopper into the compartment 8. When the predetermined amount of material has been received by the compartment 8, the bucket and its contents overbalance the weight on the scale beam and the bucket moves downwardly. This brings the link 12 into contact with the stud 23 and which breaks the joint 16, and allows the weight of the material in said compartment to swing the bucket 3 on the trunnions and thereby bring the other compartment into position to receive material. The swinging of the bucket strightens the links 14 and 15, so that they lock the bucket while said other compartment is being filled. This swinging movement of the bucket 3 also causes the link 28 to open the gate 10 so that the material in the compartment 8 is permitted to escape into a suitable receptacle, such as a carton placed below the bucket. The link 29 at the same time shuts the gate 11 to close the compartment 9. As soon as the material begins to flow from the compartment 8, the bucket is moved upwardly into its normal position by the weight 5 where it remains until the weight of the contents in said other compartment 9 overbalances the weight 5 whereupon the cycle of operations is repeated. When the abutting ends of the partitions 7 and 7.1 are passing under the mouth of the hopper 37 during the swinging movement of the bucket, the middle part of the stirrup or pan 43 temporarily cuts off the flow of material from the hopper so as to prevent material from being precipitated into the compartment 9 before the gate is entirely closed. As the bucket completes its tilting movement the arm 46 completes the swing of the stirrup, so as to bring one or the other of the openings into registration with the mouth of the chute 26. The hinged sides 27 and 28 of the supply hopper may be adjusted so as to vary the volume of material passing from the chute.

Although but one specific embodiment of this invention has been herein shown and described, it will be understood that numerous details of the construction shown may be altered or omitted without departing from the spirit of this invention as defined by the following claims.

I claim:

1. A weighing device comprising a frame, a scale beam pivoted thereon, a double compartment receptacle tiltably mounted on said scale beam, gates carried by said receptacle and arranged to open and close discharge outlets for said compartments, an arm carried by said scale beam, a system of levers connecting said receptacle with said arm and adapted to lock said receptacle in its tilted positions, and links carried by said arm and connected to said gates and adapted to cause a positive shifting of said gates for opening and closing said discharge openings when said receptacle is shifted.

2. A weighing device comprising a frame, a scale beam pivoted thereon, a double-compartment receptacle tiltably mounted on said scale beam, gates arranged to open and close discharge outlets for said compartments, a yoke suspended from said scale beam and embracing said receptatcle, means for maintaining said yoke in a substantially vertical position, a system of levers connecting said receptacle with said yoke and adapted to operate to lock said receptacle in its tilted positions, and links connecting said gates to said yoke and adapted to operate for opening and closing said gates when said receptacle is tilted.

3. A weighing device comprising a frame, a scale beam pivoted thereon, a double-compartment receptacle tiltably mounted on said scale beam, gates arranged to open and close discharge outlets for said compartments, a yoke suspended from said scale beam and embracing said receptacle, means for maintaining said yoke in a substantially vertical position, links connected together in pairs between said yoke and the receptacle at opposite sides of said yoke and adapted to alternately lock said receptacle in one or the other of its tilted positions, posts on said frame extending into position to be engaged by said links so as to break the joints thereof and permit said receptacle to tilt, and means separate from said links for opening and closing said gates when said receptacle is tilted.

4. A weighing device comprising a frame, a scale beam pivoted thereon, a double-compartment receptacle tiltably mounted on said scale beam, gates arranged to open and close discharge outlets for said compartments, a yoke suspended from said scale beam and embracing said receptacle, means for maintaining said yoke in a substantially vertical position, a system of levers connecting said receptacle with said yoke and adapted to operate to lock said receptacle in its tilted positions, links connecting said gates to said yoke and adapted to operate for opening and closing said gates when said receptacle is tilted, and a link pivoted to said frame and to said yoke and adapted to maintain said yoke in a substantially vertical position during the movement of said receptacle.

5. The combination with a supply hopper, of a receptacle tiltably mounted below said hopper, a partition dividing said receptacle into two compartments, means adapted to tilt said receptacle for moving one or the other of said compartments into position to receive the material from said hopper, and a stirrup mounted to shift across the mouth of said hopper, an arm rigidly connected to said receptacle and shiftably connected to said stirrup, said arm being adapted to locate said stirrup to one side of the mouth of said hopper when said receptacle is in either of its tilted positions and to move said stirrup to close the mouth of said hopper when said partition is swinging past said mouth during the tilting of said receptacle.

Signed at Chicago this 25th day of March, 1914.

EDWARD A. LAVO.

Witnesses:
HAZEL G. COFFMAN,
WILLIAM E. HANN.

---

Corrections in Letters Patent No. 1,117,678.

It is hereby certified that in Letters Patent No. 1,117,678, granted November 17, 1914, upon the application of Edward A. Lavo, of Chicago, Illinois, for an improvement in "Automatic Weighing-Scales," errors appear in the printed specification requiring correction as follows: Page 2, line 15, after the word "chute" insert a period; same page and line strike out the words "is provided with" and insert the words *The position of the;* and that the said Letters Patent should be read with these corrections therein that the same may conform to the record of the case in the Patent Office.

Signed and sealed this 8th day of December, A. D., 1914.

[SEAL.]

J. T. NEWTON,

*Acting Commissioner of Patents.*